Patented Mar. 12, 1946

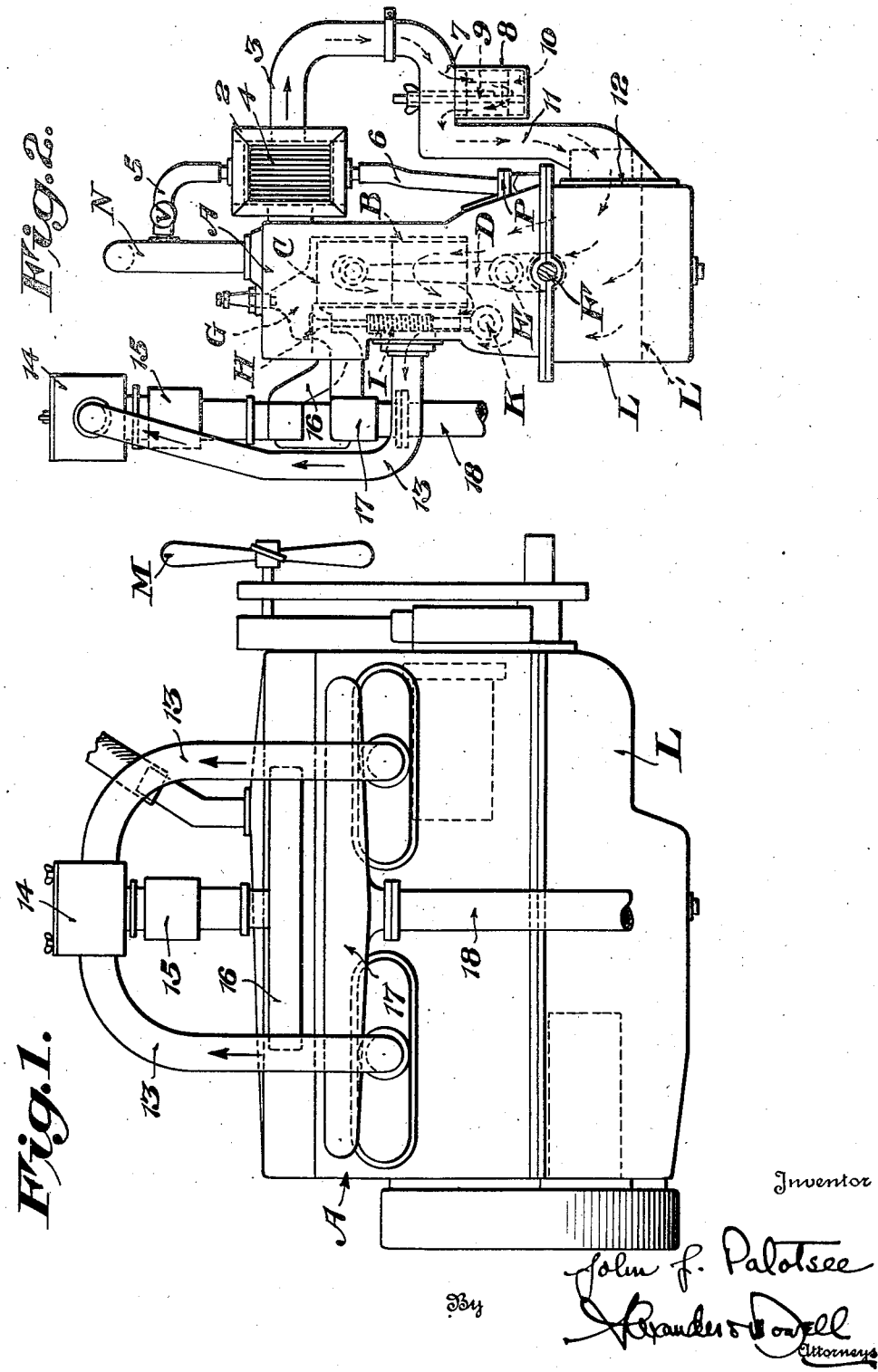

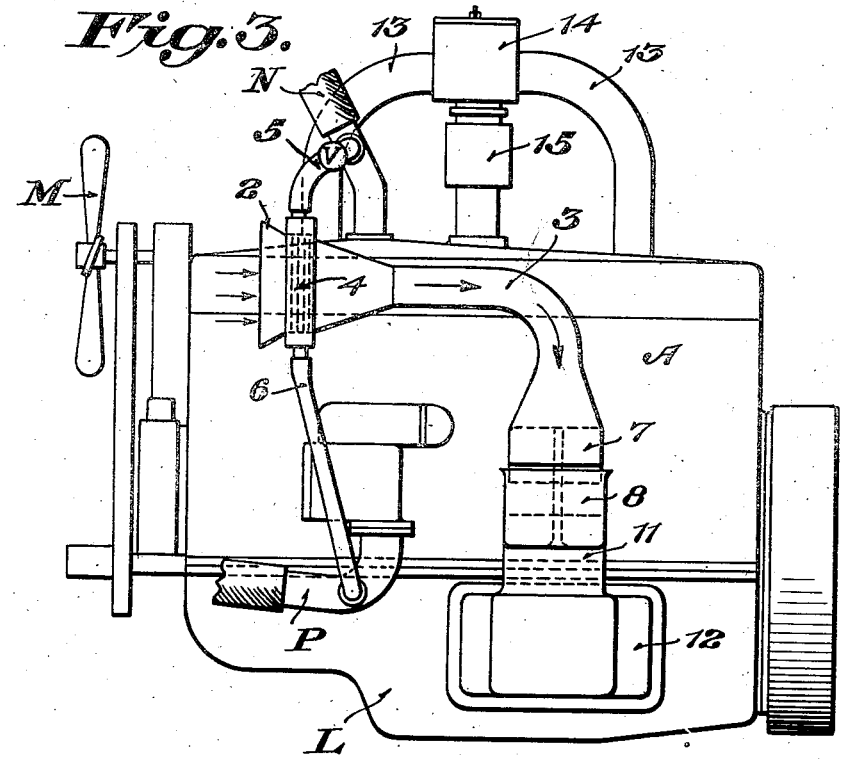
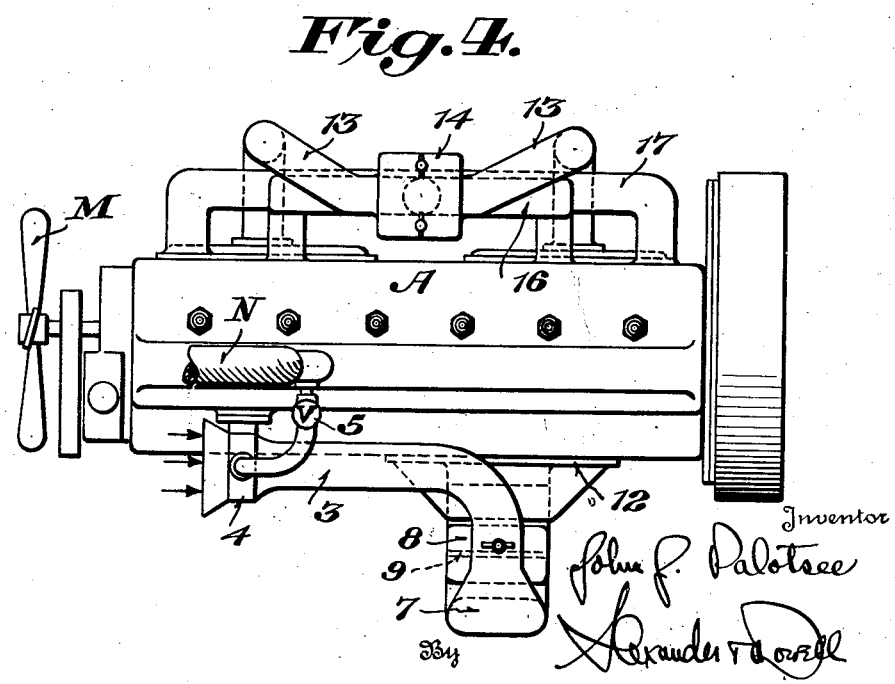

2,396,601

UNITED STATES PATENT OFFICE 2,396,601

AIR INTAKE FOR MOTORS

John J. Palotsee, Youngstown, Ohio

Application March 15, 1944, Serial No. 526,557

12 Claims. (Cl. 123—119)

This invention is a novel air intake for internal combustion engines such as used in automobiles and the like, and the principal object is to provide an intake in which air is taken in through an intake, and if desired heated, and then filtered and passed into the oil pan of the crank case, wherein the air circulates around the crank shaft, the bearings, and around the pistons and the lower ends of the cylinders, and from thence passes around the valve, valve stems, and valve springs, the air then passing into the carburetor, the passage of air through the oil pan within the motor, and the lower portions of the cylinders, removing condensation, moisture, gases of explosion which escape past the piston rings, and unburned fuel, which elements ordinarily combine to form sludge and carbon deposits within the motor especially around the valve stems and valve springs, which sludge causes considerable trouble and wear on the motor.

Another object of the invention is to provide an air intake as above described in which the air passing therearound produces a chimney effect within the motor which will cool the crank shaft, bearings, pistons and cylinders, keeping same free of sludge or carbon, and which will heat the air entering the carburetor carrying along therewith air vapors, unburned fuel, and moisture or condensation, which products are carried along with the air into the carburetor and directed into the combustion chamber.

A further object of the invention is to provide an air intake of the above description which will lubricate the air valves and the pistons, whereby the passage of air within the motor will increase the life of the motor, and will enhance its performance through avoidance of sludge and carbon deposits.

Other minor objects of the invention will be hereinafter set forth.

I will explain the invention with reference to the accompanying drawings which illustrate one practical embodiment thereof to enable others familiar with the art to adopt and use the same; and will summarize in the claims, the novel features of construction, and novel combinations of parts, for which protection is desired.

In said drawings:

Fig. 1 is a side elevation of an engine provided with my novel air intake, looking at the exhaust manifold side.

Fig. 2 is an end elevation of the engine shown in Fig. 1.

Fig. 3 is a side elevation of the engine looking at the opposite side from Fig 1.

Fig. 4 is a top plan view of the engine.

As shown, the motor A is of internal combustion type, having cylinders B (Fig. 2) in which operate pistons C connected by piston rods D with cranks E of crank shaft F, the upper ends of the cylinders B registering with combustion chambers G provided with intake and exhaust valves H controlled by springs I and operated by means of a cam shaft K in the customary manner. Oil pan L of the motor A is adapted to hold a quantity of oil in the usual manner; and at one side of the oil pan above the oil lever l' is an air inlet.

The air intake for carburetor 15 enters a funnel-shaped opening 2 of an air duct 3, the said funnel 2 being located behind the fan M of the motor or facing the direction of normal movement of the vehicle. Funnel-shaped opening 2 preferably has a preheater 4 therein, preferably of the tube type, through the tubes of which hot water from the cooling system of the motor is circulated. The upper ends of the water ducts of the preheater 4 are preferably connected to the upper radiator hose N, and the lower ends of the water ducts of the preheater 4 are preferably connected to the lower radiator tube P. The air may be preheated in cold weather by means of preheater 4 to guard the motor A against damage, or preheater 4 may be entirely shut off in warm weather. Any other means, however, for heating the water in the tubes of preheater 4 may be used; and the preheater may be eliminated or cut out in hot weather.

The air is forced from inlet 2 between the preheater pipes by the motor fan M and forced through tube 3 to the air intake 7 of an air filter 8, having one or more baffle plates 9 (Fig. 2) extending downwardly into a liquid medium 10 in the bottom of filter 8, from whence the air passes upwardly beyond the baffle plates 9 and downwardly through tube 11 into the air intake of the oil pan L above the lubricant level L', as at 12, Fig. 2, where the air enters the oil pan L and passes therethrough around the bearings and valves, and the lower ends of cylinders B, and around the valve springs I of cam shaft K and outwardly through holes into pipe 2, the air then passing upwardly to an air filter 14. Filter 14 preferably contains steel wool or similar material to filter out any loose carbon or dirt before the air enters the carburetor 15. From filter 14 the air passes downwardly into carburetor 15. From carburetor 15 the air is directed through intake 16 to the intake valves leading to the combustion chambers G. The spent gases of combustion are then exhausted through exhaust valves to the exhaust manifold 17 and through duct 18 to the usual muffler (not shown).

By the above construction, the air taken into the motor may or may not be preheated in preheater 4, as desired, then filtered in the liquid filter 8 after passing the air intake 7, and the air then directed into the lower portion of the oil pan L where the air spreads and passes around the interior of the crank case, around the crank case bearings, pistons C, and the lower ends of cylinders B, the air passing through openings adjacent the valve springs I around the valve stems and through ducts 13 through an air filter 14 into carburetor 15. The passage of hot air through all parts of the oil pan L and through the interior of the motor cylinders, removes condensation, moisture, blow-by or gases of explosion which escape past the piston rings, and unburned fuel. These elements combined ordinarily form sludge and carbon deposits inside the motor, and especially around the valves, stems, and springs, which cause considerable wear and trouble on the motor.

This chimney effect of the intake air which is set up within the motor A thus cools the crank shaft F, bearings, pistons C, cylinders B, and keeps same free of sludge or carbon deposits, and in turn heats the air entering the carburetor 15 along with the air vapors, unburned fuel, and moisture or condensation, which products are carried over into the carburetor 15 and into the combustion chambers G and said products furthermore lubricate the valves and pistons. By this passage of air through the interior of the motor casing, the life of the motor is considerably increased, and the performance of the motor is benefited by preventing deposits of sludge and carbon.

I do not limit my invention to the exact forms shown in the drawings, for obviously changes may be made therein within the scope of the claims.

I claim:

1. In an internal combustion engine having a block provided with a crank case and cylinders and having a carburetor leading into the cylinders; an air intake for said carburetor comprising an air funnel directing the air therein into said crank case below the cylinders, means for preheating the air passing into the crank case; said air circulating through said crank case and into and around the lower ends of said cylinders; and means for directing the air from the crank case into said carburetor for admixture with the gaseous fuel charge.

2. In an engine as set forth in claim 1, an air filter in said means in advance of the carburetor.

3. In an internal combustion engine having a block provided with a crank case and cylinders and ignition chambers in said cylinders provided with intake and exhaust valves, and having means within the crank case for operating said valves, and having a carburetor leading to the ignition chambers; and air intake for said carburetor comprising an air funnel directing the air therein into said crank case below the cylinders, means for preheating the air passing into the crank case; said air circulating through said crank case and into and around the lower ends of said cylinders and around said valve operating means; and means adjacent said valve operating means receiving and adding the air from the crank case into said carburetor for admixture with the gaseous fuel charge.

4. In an engine as set forth in claim 3, an air filter in said means in advance of the carburetor.

5. In an internal combustion engine having a block provided with a crank case and cylinders and ignition chambers in said cylinders provided with intake and exhaust valves and having means within the crank case for operating said valves; and having a carburetor leading to the ignition chambers; an air intake for said carburetor comprising an air funnel, an air filter receiving the air from said funnel and directing same into said crank case below the cylinders, means for preheating the air passing into the crank case; said air circulating through said crank case and into and around the lower ends of said cylinders and around said valve operating means; and means adjacent said valve operating means receiving and directing the air from the crank case into said carburetor for admixture with the gaseous fuel charge.

6. In an engine as set forth in claim 5, a second air filter in said means in advance of the carburetor.

7. In an internal combustion engine having a block provided with a crank case and cylinders, said engine having a liquid cooling system including a fan; and having a carburetor leading into the cylinders; an air intake for said carburetor comprising an air funnel into which air is directed by said fan; a preheater in said funnel; means for directing the air from the preheater into said crank case below the cylinders; said air circulating through said crank case and into and around the lower ends of said cylinders; and means for directing the air from the crank case into said carburetor for admixture with the gaseous fuel charge.

8. In an engine as set forth in claim 7, an air filter in said means in advance of the carburetor.

9. In an engine as set forth in claim 7, said preheater having water ducts therein; and means for circulating liquid from the cooling system through said ducts.

10. In an internal combustion engine having a block provided with a crank case and cylinders and ignition chambers in said cylinders provided with intake and exhaust valves, and having means within the crank case for operating said valves, said engine having a liquid cooling system including a fan; and having a carburetor leading to the ignition chambers; an air intake for said carburetor comprising an air funnel into which air is directed by said fan; a preheater in said funnel; an air filter receiving the air from said funnel and directing same into said crank case below the cylinder, said air circulating through said crank case and into and around the lower ends of said cylinders and said valve operating means; and means adjacent said valve operating means receiving and directing the air from the crank case into said carburetor for admixture with the gaseous fuel charge.

11. In an engine as set forth in claim 10, a second air filter in said means in advance of the carburetor.

12. In an engine as set forth in claim 10, said preheater having water ducts therein; and means for circulating liquid from the cooling system through said ducts.

JOHN J. PALOTSEE.